United States Patent [19]

Conrad et al.

[11] 4,107,256

[45] Aug. 15, 1978

[54] SUSPENSION POLYMERIZATION OF POLYURETHANES AND SPIN-MOLDING THE POWDER PRODUCT THEREOF

[75] Inventors: Wendell R. Conrad, Kent; Shingo Futamura, Seville; Robert A. Hayes, Cuyahoga Falls, all of Ohio

[73] Assignee: The Firestone Tire & Rubber Company, Akron, Ohio

[21] Appl. No.: 788,214

[22] Filed: Apr. 18, 1977

[51] Int. Cl.$^2$ .................. B29C 5/04; C08G 18/82; C08G 18/83; C08G 18/86

[52] U.S. Cl. .................. 264/310; 264/311; 427/13; 427/85; 528/48; 528/65; 528/61; 528/59; 528/50

[58] Field of Search .......... 260/75 NE, 77.5 AA, 260/75 NP, 75 NQ, 77.5 AQ, 77.5 AN; 264/310, 311

[56] References Cited

U.S. PATENT DOCUMENTS

| | | | |
|---|---|---|---|
| 3,187,381 | 6/1965 | Britten | 264/311 |
| 3,271,500 | 9/1966 | Santelli | 264/311 |
| 3,310,533 | 3/1967 | McElroy | 260/77.5 AA |
| 3,341,896 | 9/1967 | Barnett et al. | 264/311 |
| 3,525,717 | 8/1970 | Butler et al. | 260/75 NE |
| 3,787,525 | 1/1974 | McGarr | 260/859 R |
| 3,817,886 | 6/1974 | McGarr | 260/18 TN |
| 3,850,880 | 11/1974 | Hakanson et al. | 260/75 NE |
| 3,894,994 | 7/1975 | Day et al. | 260/75 NE |
| 3,969,475 | 7/1976 | Horiuchi et al. | 264/310 |

*Primary Examiner*—H.S. Cockeram

[57] ABSTRACT

Polyurethanes having a fine particle size are prepared according to a suspension process wherein silicone surfactants are utilized and the polymerization is carried out under agitation in a nonaqueous and a nonsolvent system according to either a two step, or preferably a one step process. The produced suspension-type polyurethanes are generally powders or very small granules and, therefore, can be utilized directly for rotational or spin molding processes wherein they are cured through the use of specific curing agents. Additionally, generally any suspension polyurethanes having a plasticity value of at least 2,000 square mm. at 150° C, can be cured in a rotational or spin molding operation utilizing specific curing agents and curing at a temperature below the decomposition temperature of the polyurethane, for example, below 250° C.

39 Claims, No Drawings

SUSPENSION POLYMERIZATION OF POLYURETHANES AND SPIN-MOLDING THE POWDER PRODUCT THEREOF

BACKGROUND OF THE DISCLOSURE

The present invention relates to a process for the suspension polymerization of polyurethanes. More particularly, the present suspension polymerization process utilizes silicone surfactants to produce polyurethanes having a very fine particle size which are ideally suited for roto casting or other spin molding operations, fluidized bed coatings, and the like.

Heretofore, polyurethanes have been generally prepared either in bulk or solution. Utilization of either the bulk or a solution polymerization method does not result in fine powders which are often necessary as in the case of molding urethanes through roto casting, fluidized beds, etc. Powders can only be obtained by pelletizing, grinding, and the like at very low temperatures and thus, constitute an expensive process.

U.S. Pat. No. 2,973,333 to Katz discloses the production of polyurethanes by reacting bischloroformates of a diol with a diamine. A very similar U.S. Pat. No. is Katz, 3,089,864, which was divided from the patent application later maturing into U.S. Pat. No. 2,973,333. In yet another Katz Patent, U.S. Pat. No. 2,929,802, polyurethane is made by a similar condensation reaction between monomeric diamines and bischloroformates derived from a low molecular weight glycol. In all of these three patents, the preferred methods for preparing polyurethanes is by a polymerization in an emulsion wherein water constitutes the continuous phase while an inert water-miscible liquid which is solvent for each polymeric reactant as well as a temporary solvent for the formed polymer, constitutes the dispersed phase. Polymerization occurs through an interfacial reaction. Moreover, the organic medium dissolves the formed polymer necessitating the addition of a precipitating solvent. Similarly, U.S. Pat. Nos. 3,485,802 and 3,377,322 to Witsiepe also relate to interfacial polymerization of bishaloformates of esters or ethers with diamines such as piperazine to produce polyurethanes. As with Katz, a precipitating solvent is generally utilized.

Of interest is French Patent No. 1,335,037 which relates to catalytic systems for the production of nonurethane dispersed polymers and British Patent No. 1,007,476, which generally relates to polymerized ethylenically unsaturated monomers which are polymerized to obtain a product in a very finely divided form as suspensions of particles of the polymeric product in an organic medium. Typical polymers are styrene, polyvinyl chloride, acrylonitrile and rubbers such as polybutadiene.

Urea-urethane polymers have been produced utilizing diamines with the aid of some agitation. In U.S. Pat. No. 3,872,049, these solid urea-urethane particles are prepared by utilizing a diamine curing agent and an isocyanate terminated urethane prepolymer of a hydroxy-terminated polyester polyol. The liquid reaction medium contains aromatic hydrocarbon solvents which swell the chain extended urea-urethane polymer. The polymer is then separated by pouring it into an aliphatic or alicyclic hydrocarbon. Generally, very finely divided urea-urethane particles are not obtained and the polymers tend to exhibit high gel. Another prior art patent, U.S. Pat. No. 3,655,627, relates to preparing solid particles of urea-urethane polymers by reacting urethane prepolymers made from diisocyanates and polyols in an aqueous medium with primary diamines. U.S. Pat. No. 3,525,717, also relates to the preparation of urea-urethane polymers by reacting isocyanate-terminated polyesters or polyethers in a water-miscible solvent with a diamine.

U.S. Pat. No. 3,917,741 to McGarr relates to the production of urethane powders. As set forth in this patent, reactive materials which form solid polyurethane resins are introduced into an organic liquid medium which is inert to the reactive materials and in which at least one of the reactive materials and the solid polyurethane is insoluble. Reaction between the reactants takes place at the surface of the insoluble reactive material which is emulsified as fine droplets and thus an interface reaction occurs. Intensive agitation is required along with a specific type of surfactant. Generally the surfactant is an organic copolymer such as a product of copolymerizing vinyl pyrrolidone with an alkylated olefin. A specific example is a copolymer of vinyl pyrrolidone and hexadecene-1.

Yet another prior art patent which relates to the formation of urethane powders or granules is British Patent No. 1,408,945 wherein the urethane prepolymer is dissolved in a chemically inert and anhydrous solvent and chain extended. Then a volatile tertiary amine is added as a catalyst and the reaction proceeds until the initially clear solution gradually passes into a dispersion. The dispersion is then subjected to a steam treatment wherein the polyurethane is separated. Preferred solvents form an azeotropic mixture with water and suitable solvents include xylene and toluene.

In contrast to these prior art patents, the present invention does not utilize aromatic hydrocarbons, water systems, or the like but rather relates to the use of aliphatic hydrocarbon solvents, diol chain extenders and silicone-type suspending agents in a nonaqueous system to produce solely polyurethanes via a two step or a one step process having very fine particle size and which urethane particles are ideally suited for roto casting or spin molding operations, wherein the urethane polymers can be cured utilizing specific curing agents. Additionally, any urethane suspension polymers having a plasticity of 2,000 square mm. or more at 150° C, can be cured during a spin molding operation when specific curing agents are used.

SUMMARY OF THE INVENTION

It is, therefore, an object of the present invention to provide a process for the nonaqueous suspension polymerization of polyurethane.

It is an additional object of the present invention to provide a suspension process for the production of polyurethane, as above, wherein silicone suspending agents and agitation are utilized to promote the suspension polymerization for producing fine or small granules of polyurethane particles.

It is yet another object of the present invention to provide a suspension process for the production of polyurethane, as above, wherein reaction exotherms normally encountered are generally reduced and aliphatic hydrocarbon solvents are utilized.

It is yet another object of the present invention to provide a suspension process for the production of polyurethane, as above, wherein either a two step process or a single step process can be utilized.

It is yet another object of the present invention to provide a suspension process for the production of polyurethane, as above, according to a one step process wherein diol chain extenders are utilized along with urethane prepolymers or diols and polyisocyanates are utilized along with polyhydroxyl terminated compound.

It is yet another object of the present invention to provide a suspension process for the production of polyurethane, as above, wherein a two step process involves adding isocyanate end groups to polyhydroxyl terminated compounds through the use of polyisocyanates in the first step and the chain extension of isocyanate end capped compounds with diol chain extenders in the second step to form the polyurethane.

It is yet another object of the present invention to provide a suspension process for the production of polyurethane, as above, wherein the polymerization may be carried out in an inert atmosphere, and wherein catalysts may be utilized.

It is yet another object of the present invention to provide a suspension process for the production of polyurethane, as above, wherein the produced fine urethane particles can be molded or cured during a rotational or spin molding operation utilizing specific curing agents.

It is yet another object of the present invention to cure urethane polymers in a rotational or spin molding operation by utilizing suspension polyurethanes having a plasticity value of at least 2,000 square mm. at 150° C along with specific curing agents.

These and other objects of the present invention will become apparent from the following specification which describes in detail various embodiments without attempting to discuss all of the modifications in which the invention might be embodied, the invention being measured by the appended claims and not by the details of the specification.

In general, a process for the suspension polymerization of polyurethanes, comprises, adding a nonaqueous and non solvent suspending medium, adding a silicone surfactant to said suspending medium, adding a urethane prepolymer to said suspending medium, agitating said nonaqueous suspending medium, said silicone surfactant and said urethane prepolymer, and adding a chain extending agent to said suspending medium containing said urethane prepolymer to produce polyurethane polymers in fine discrete particles. Alternatively, polyhydroxyl terminated compounds may be utilized in lieu of the urethane prepolymers, in which situation, diisocyanates are reacted with the hydroxyl terminated compounds to give a urethane prepolymer as a first step with the urethane prepolymer then being chain extended to produce the powdered polyurethane as a second step.

Another process for the suspension polymerization of polyurethanes, comprises, adding a nonaqueous and non-solvent suspending medium, a silicone surfactant, polyhydroxyl terminated compounds, diisocyanates, and chain extending agents to a vessel and agitating said vessel to produce polyurethane polymers in fine discrete particles according to a one step process.

Additionally, a process for curing suspension polyurethanes during a spin molding operation, comprises, spinning and heating a mold having therein a fusible suspension powdered compound selected from the class consisting of polyurethane, a urethane-urea polymer, and combinations thereof, having a plasticity of at least 2,000 square mm. at 150° C and a curing agent, said heating temperature ranging from about 130° C to a temperature below the decomposition temperature of said suspension powdered blend to produce a cured article. The suspension polyurethanes produced according to the above processes generally have the desired plasticity of at least 2,000 square mm. at 150° C.

DESCRIPTION OF THE PREFERRED EMBODIMENTS

According to the concepts of the present invention, powdered or very fine granular polyurethanes are produced by a suspension process generally utilizing a nonaqueous aliphatic and non-solvent suspending medium, silicone surfactants, urethane prepolymers and chain extending agents in the presence of sufficient agitation in a one step operation. Generally, if polyhydroxyl terminated compounds are used to form urethane prepolymers through the reaction with diisocyanate compounds, a two step process results with the second step involving the addition of the diol or amino alcohol chain extenders. However, if polyhydroxyl terminated compounds are utilized, a one step process is preferred wherein all of the compounds, including the diisocyanates and the chain extending compounds, are added relatively simultaneously to a vessel with the contents under agitation and the various reactions allowed to proceed simultaneously to produce the very fine particle sized urethane polymers. Generally, the urethane polymers produced according to one of these three methods has a plasticity value of at least 2,000 square mm. at 150° C. In any event, the suspension polyurethane polymers as well as any other polyurethane polymers having such a plasticity value may be blended with specific curing agents and added to a rotational or spin mold and spun and heated to a temperature below the decomposition temperature of the polyurethane to produce a cured article. Throughout this disclosure it is to be understood that the term "polyurethane" or the term "urethane" polymer also includes urea-urethane polymers as well as combinations or mixtures of urethane and urea-urethane polymers.

Considering the production of suspension polyurethanes wherein polyhydroxyl terminated compounds are utilized, such compounds may be a polyester, a polyol, a polyester polyol, mixed polyester-polyamide, a polyether, a polycaprolactone or any other polyhydroxyl compound well known to those skilled in the art. The urethane prepolymer is then formed by reacting the compound with a diisocyanate to form a urethane prepolymer generally having terminal isocyanate groups. Preferably, the urethane prepolymer is a liquid. Of course, it should be apparent to one skilled in the art that numerous urethane prepolymers may be prepared according to conventional methods. Specific examples of various compounds containing hydroxyl end groups include copolymers of tetrahydrofuran and ethylene oxide, propylene oxide or butane oxide; polyethylene ether diol, polytrimethylene ether diol, polyhexamethylene, ether diol, polypropylene ether diol, polytetramethylene ether glycol (polytetrahydrofuran), polyethylene adipate, polyethylenepropylene adipate, polypropylene adipate, polybutadiene diol and polycaprolactone. Preferred hydroxyl terminated compounds include polypropylene ether diol, polytetramethylene ether glycol, polyethylenepropylene adipate and polycaprolactone.

The diisocyanates which are reacted with the hydroxyl terminated compounds to form the urethane prepolymer can be represented by the formula R(N=C=O)$_2$ where R can be an aliphatic containing from 2 to about 20 carbon atoms, a cycloaliphatic containing from 4 to about 20 carbon atoms and an aromatic containing from 6 to about 20 carbon atoms and mixtures thereof. Examples of diisocyanates include the various isomers of compounds such as diphenyl diisocyanate and the like. Preferred diisocyanates include the various isomers (i.e., meta-, ortho-, para-) of phenylene diisocyanate, bitolylene diisocyanate, dianisidine diisocyanate, isophorone diisocyanate, 1,4-naphthalene diisocyanate, hexamethylene diisocyanate and pentamethylene diisocyanate. Toluene diisocyanate and diphenylmethane diisocyanate are highly preferred.

The amount of the diisocyanates utilized can generally vary. Of course, a sufficient amount is utilized so that free isocyanate groups exist as upon the prepolymer chain to permit chain extension. Additionally, the formation of urethane prepolymers is carried out at temperatures and pressures or other conditions well known to those skilled in the art. Generally, the amount of diisocyanates added to the various hydroxyl terminated compounds set forth above is such that the amount of free isocyanate in the urethane prepolymer solution ranges from about 1.75 percent to about 15 percent by weight based upon the weight of the urethane prepolymer. By the term "free isocyanate" is meant unreacted isocyanate groups (NCO) which are free to further react and encompass unreacted isocyanate groups attached to the hydroxyl terminated compound via a reacted isocyanate group of said diisocyanate as well as completely unreacted diisocyanates which, of course, contain two free isocyanate groups. A desired range of the amount of free isocyanate groups is from about 2.7 percent to about 12.0 percent with a preferred amount being from about 6 percent to about 9 percent. Generally an amount of completely free isocyanate sometimes is desired since the free isocyanates will react with a chain extender to form free urethane segments and thus impart good physical properties to the product including a high modulus. The molecular weight of the urethane prepolymers generally ranges from about 600 to about 5,000 with a preferred molecular weight range being from 600 to about 3,000.

Although the above-described urethane prepolymers may be made in situ, generally such urethane prepolymers are readily available on a commercial basis from numerous manufacturers as well known to those skilled in the art.

During the process or formation of the prepolymer and chain extension which may be carried out in any conventional reaction vessel, it is important that the environment should be virtually free from active hydrogen compounds such as water, alcohol, acids, or oxygen so that the isocyanate end groups are not reacted and tied-up by the active hydrogen compounds. Thus, an inert atmosphere is often utilized such as nitrogen, helium, and the like. In general, it is desirable to keep any moisture or water content well below 100 parts per million of suspension medium and preferably below 10 parts per million.

It is an important aspect of the present invention that the suspension medium or the compound in which the suspension polymerization of the prepolymers is carried out is a nonaqueous system. Moreover, it is important that the nonaqueous system is also a nonsolvent with respect to the chain extended polyurethane. Otherwise, suitable fine particle suspension polymers simply cannot be obtained due to lump formation and poor dispersion. Desired compounds include the alkanes having from 4 to about 12 carbon atoms and preferably containing 5, 6, or 7 carbon atoms; that is, pentane, hexane, and heptane.

Should a solvent be utilized which is a partial solvent, that is, also a partially aqueous solvent, it has been found that lumps are produced as well as nonuniform dispersion instead of the desirable very fine polyurethane particles. Additionally, it has also been found that various aromatic solvents such as toluene and xylene cannot be utilized since they also produce very large lumps and tend to interfere with the suspension process. Although alicyclic solvents can be utilized, they are not desirable since some solution polymerization occurs. However, an exception is cyclohexane which yields fair dispersion of fine particle size.

It is an important aspect of the present invention to utilize mixing or agitation of the nonaqueous medium to produce the suspension-made polyurethane. Generally, any conventional device may be utilized such as high speed mixer, mechanical stirrer or the like. The key to the selection of the proper mixing device is simply that it provides sufficient shear, agitation or turbulence to permit suspension polymerization of the prepolymers. Preferably, devices which provide high agitation or turbulence are utilized since they permit larger amounts of prepolymer to be polymerized in the same vessel.

It is an important aspect of the present invention to preferably utilize a suspending agent. It has been found that a specific class of surfactants readily produce urethane polymers having fine particle size and which can be readily used in spin molding or roto casting operations. Generally, the surfactants of the present invention relate to silicone surfactants and more specifically to copolymers made from dimethyl polysiloxane and polyoxyalkylene. Generally, the polyoxyalkylenes either form block copolymers with the dimethyl polysiloxanes or graft copolymers, in which latter situation, the polyoxyalkylene polymers will form side chains or be pendant from the siloxane polymer. Generally, the polyoxyalkylene may contain from 2 to about 20 carbon atoms. Additionally, although the polysiloxane polymer contains primarily dimethyl groups in the repeating segment, it may have some occasional phenyl groups or diphenyl groups, a sole methyl group or an alkyl or dialkyl group having from 2 to 4 carbon atoms such as diethyl and the like. Hence, the basic requirement is that a polysiloxane be utilized which is substituted primarily with two methyl groups. Preferred silicone surfactants include a block copolymer of dimethyl polysiloxane polyoxyalkylene such as SF-1034 manufactured by General Electric or DC-190 (a similar surfactant but containing ester groups) by The Dow Chemical Company. Based upon 100 parts by weight of the prepolymer, from about 0.1 to about 7.0 parts by weight of the suspending agent is utilized with a preferred range being from about 0.5 to about 2.0. Generally, if less than 0.1 parts is utilized, large polyurethane particles are obtained whereas if amounts greater than 7.0 parts are utilized, near emulsion particles are generally obtained.

Whether the single stage process which is preferred is practiced using the prepolymer or the two stage process is practiced preparing the prepolymer from polyhydroxyl terminated compounds, the various compounds may generally be added in any manner. A desirable or preferred manner of preparing the suspension polyurethanes is to first add the nonaqueous medium to a reaction vessel or other type of enclosure wherein the vessel desirably has been purged with an inert gas. The suspending agent is then added and mixed through agitation of the nonaqueous medium. If utilized, a catalyst is added to the vessel followed by the prepolymer and then the chain extending agent. Of course, all of these compounds can generally be added virtually at the same time or in a simultaneous manner. When a polyhydroxyl terminated compound is utilized to form the prepolymer, the desired order is identical except that in lieu of the prepolymer, the polyhydroxyl terminated compound is added to the vessel followed by the addition of a desirable amount of the diisocyanate. Then, the vessel is heated until a prepolymer is formed at which time the second stage is commenced by adding the chain extending agent.

Usually the time of the reaction, of course, will vary depending upon the various parameters such as the size of the reaction vessel, the amount of prepolymer or the amount of the polyhydroxyl compound and the diisocyanate, the temperature of the reaction, the pressure, and the like. Concerning the temperature of the reaction, it generally varies with the specific nonaqueous medium and the type of silicone surfactant. Usually, the temperature will range from about 0° C to about 100° C at atmospheric pressure for both the formation of the prepolymer as well as the chain extension or polymerization of the prepolymers. The temperature should, of course, be kept below the boiling point of the suspending medium. Slight pressure such as up to about 4 atmospheres may be utilized if desired, and will also increase the boiling point temperature. However, high temperatures are undesirable and should be avoided since a substantial number of very small fines is usually produced along with a substantial number of lamps.

The chain extending agents of the present invention are generally diols or amino alcohols having from 2 to about 7 carbon atoms. These compounds, of course, react with the isocyanate terminated prepolymers to form long chains. Examples of specific diols include ethylene glycol, the various isomers of propylene glycol, the various isomers of butane diol, the various isomers of pentane diol and the various isomers of hexane diol. A preferred chain extender is n-1,4-butane diol. Examples of specific amino alcohols include ethanolamine, propanolamine, butanolamine, pentanolamine, hexanolamine, heptanolamine and the various isomers thereof such as 2-amino-1-butanol. Ethanolamine is preferred. Generally, the amount of chain extending agent added ranges from about 0.8 to about 1.5 and desirably from about 0.9 to about 1.3 equivalents based upon the free isocyanate groups. A highly preferred range is from about 0.95 to 1.05. An excess of diol is sometimes desired so that the polymer chains formed tend to have a low molecular weight and produce powders.

Since water would react with the diisocyanates and interfere with the chain extension, care is taken to eliminate any water as above noted. Additionally, diamines, either by themselves or in association with water, are clearly not within the scope of the present invention since it has been found that diamines tend to give high gel with the amount of gel increasing over a period of time such as a couple of weeks. Moreover, the diamines raise the fusion temperature required for processing into a final product whereas high gel tends to produce different polymer properties.

Catalysts are preferred in the present invention to help promote reaction of the diol compounds and chain extend the prepolymers although in some instances, they need not be utilized. Desirable catalysts include the metallic esters (soaps) and the organo-tin compounds. Specific examples include antimony pentachloride, potassium oleate, dibutyltin diacetate, dibutyltin dilaurate, stannous octoate, stannous chloride, lead benzoate, lead oleate, zinc naphthenate, zinc 2-ethylhexoate, cobalt 2-hethylhexoate, cobalt octoate, N-N-dimethylbenzylamine and N-lauryl morpholine. Dibutyltin dilaurate is preferred. In lieu of organo-tin compounds, conventional organo-mercury compounds may be utilized. Some of these compounds are identical to those set forth immediately above wherein the mercury, of course, has replaced the tin component.

Although the catalysts may be added before the chain extending diols, it may sometimes be desirable to add the catalysts after the prepolymer and the diols have reacted for a few minutes. In this manner, generally, a lower molecular weight polyurethane product is obtained. The actual amount of catalyst desired will, of course, generally vary with the desired reaction rate. However, it has been found that a range of from about 0.01 to about 5 parts per 100 parts by weight of prepolymer is desirable with a preferred range being from about 0.05 to about 0.5 parts.

According to the present invention, a "one shot" process may be utilized. That is, a polyhydroxyl terminated compound as well as a diisocyanate compound is added to a vessel along with various other compounds such as the short chain diols or amino alcohols and heated to form suspended polyurethanes in one step in contrast to the previously discussed two step process. The various compounds including the suspending agents, the suspending medium, a catalyst, if necessary, as well as the diisocyanates, short chain diols and the amino alcohols and polyhydroxyl terminated compounds, are all the same as set forth above. Although these compounds may be added in any order, it is desirable to add the diisocyanate last since in the "one shot" process, the diisocyanate tends to act as a chain extender with respect to both the polyhydroxyl terminated compounds and the short chain diols or amino alcohols. The amount of diisocyanate utilized based upon a stoichiometric equivalent of the isocyanate groups to the hydroxyl groups of both the polyhydroxyl compounds and the short chain diol or amino alcohol compounds, ranges from about 0.90 to about 1.10 and preferably from about 0.99 to about 1.1. The amount of the short chain diol or amino alcohol may be 0 or approximately 0.1 to about 5 moles per mole of long chain polyhydroxyl terminated compound. A more desirable range is from about 0.1 to about 2 moles per mole of polyhydroxyl terminated compound. The short chain diols are preferred in the one shot process. The polyhydroxyl terminated compound generally has a molecular weight of from about 600 to about 3,000. A preferred range is from about 600 to about 2,000. The amount of the short chain diol or amino alcohol compound usually controls the physical properties in that a soft to a hard suspended polyurethane is produced depending whether none, a small amount, or a large amount, respectively, is utilized. The amounts of the other compounds, such as the silicone surfactant per 100 parts by weight of the hydroxyl terminated compound, the suspending medium and the catalyst, if any, are desirably the same as set forth above. Similarly, the polymerization temperature and pressure are also within the same ranges as set forth above.

If suspended polyurethane powders are produced starting with polyhydroxyl terminated compounds and diisocyanates, the one shot process is preferred over the above-noted two shot process wherein, first the prepolymer is made and then after polymerization is completed, the diol chain extender added since the one shot process eliminates the additional step of the diol addition and usually substantially shortens the polymerization time.

The polyurethanes produced according to the present invention, regardless of the polymerization process, can be separated from the nonaqueous and nonsolvent medium in any number of ways, such as by filtration, evaporation of the medium, centrifuging, application of a vacuum, and the like. Moreover, the produced polyurethanes generally have very fine particle sizes which is less than 1 millimeter and preferably they have a particle size from about 0.02 to about 1.0 millimeters and thus, are usually referred to as powders or very fine granulars. Also, since the nonaqueous medium acts as a heat sink and reduces exotherms, better temperature control of the reaction is readily accomplished. Better temperature control, thus leads to a relatively narrow molecular weight distribution of the polyurethanes with respect to that obtained such as through bulk polymerization. Hence, the physical properties of the suspension prepared polyurethanes, as a whole, have been found to be approximately the same or better than that obtained as with bulk polymerization. Another distinct advantage of the present invention is that due to the fine particle produced, there is no need to grind, chop, or reduce the particle size and the chain extended polymer may be directly molded, roto casted, extruded, compression molded, utilized in fluidized beds or in electrostatic precipitating coatings, or the like. Another advantage is that the polymers have relatively low gel and flow well.

It has been found that the suspension polymers produced in accordance with the present invention can be very readily compounded and cured or postcured, especially in a spin molding operation or a roto casting process. That is, the suspension powders, fines or granulars are added to a mold which is spun about at least one axis so that upon melting, the powder is generally evenly distributed about the mold. Of course, curing agents can be added to the suspension polymer so that a cure generally occurs simultaneously with the spin molding operation. This result is unexpected in that most urethane polymers do not work since they are not powders and/or they are simply too viscous.

Additionally, the suspension polymers may be compounded with typical amounts of conventional compounding agents in a conventional manner as known to those skilled in the art. For example, various fillers may be utilized such as silicas, clays, carbon blacks, various coloring agents may be used, various antioxidants may also be used along with a host of other compounding agents well known to those skilled in the art, along with the urethane curing agents.

The curing agents for the spin molding operation are generally diisocyanates, peroxides, epoxides and various dimers of diisocyanates. Preferred diisocyanates include those which have a high boiling point so that upon the spin molding operation wherein the urethane powders melt, the diisocyanate curing agent will not vaporize off. Usually, the suspension polymers of the present invention will melt in the range of approximately 130° C to about 220° C. Thus, diisocyanates, as well as the other curing agents which react within this range are desirable. Generally, dimers which have slightly higher reaction temperature than the melting point of the suspension polymers are preferred, since the article may first be formed and then cured. In any event, the melting and curing operation is usually simultaneous or occurs rapidly in successive order. Examples of specific diisocyanates include MDI (diphenyl methanediisocyanate), bitoluene diisocyanate, dianisidine diisocyanate, hexamethylene diisocyanate, 1,5-naphthylene diisocyanate, 4,4'-methylenebis(cyclohexylisocyanate) and the like. Generally, the formula of the diisocyanates which may be utilized is the same as that set forth above with regard to the formation of the prepolymer. Additionally, it has been found that the dimer of diphenyl methanediisocyanate may also be utilized as well as the dimer of toluene diisocyanate. Considering the peroxide curing agents, generally any conventional curing agent may be utilized as well known to those skilled in the art. Specific examples include dicumyl peroxide, t-butyl perbenzoate, dimethyl bis(t-butyl peroxy) hexyne, t-butyl peroctoate, and the like. As previously noted, the key to the selection of a particular peroxide is that it has a curing temperature in the melting range of the particular suspension urethane polymer utilized. Of course, the melting temperature of the particular suspension urethane polymer can vary over a wide range depending upon the type of polymer utilized. Considering the epoxides, various conventional epoxide curing agents utilized for curing urethane polymers, as well known to those skilled in the art, may be utilized. Specific examples include diglycidyl bisphenol A and the dimers and trimers thereof. In any event, regardless of the specific type of urethane curing agent utilized, generally the amount ranges from 0.2 to about 10 parts per 100 parts of polymer with a range of from about 1 to about 5 parts being preferred.

Generally, the curing agent may be added to the suspension powder at any point in time and mixed since the only important fact is that the mold contains a distribution of the curing agent to effect a good and thorough cure. Thus, the curing agents can be added to the suspension polymers, mixed and then added to a rotational or spin molding apparatus, or the curing agent may be added directly to the spin molding apparatus so long as a sufficient amount of time exists so that the curing agent is thoroughly blended before the polymer melts and the curing commences.

Another aspect of the present invention is that generally any fusible, powdered polyurethanes produced according to any process wherein the powder has a plasticity value of at least 2,000 square millimeters (mm) at 150° C. can be cured in a spin molding or rotational molding process utilizing the same curing agents as set forth above. A fusible powdered urethane is one which does not decompose under suitable curing agent reaction temperatures, that is at temperatures below the decomposition temperature of the polyurethane powder. Generally, the curing temperature range is from about 130° C to below the decomposition temperature of about 250° C. Usually, any of the powdered urethanes produced according to the above-described processes of the present invention, will yield a plasticity value of greater than 2,000 at 150° C. Other powdered urethanes which can be utilized include those urethanes set forth in U.S. Pat. Nos. 3,525,717 to Butler et al; 3,655,627 to Hutzler et al; 3,872,049 to Farah et al; 3,917,741 to McGarr et al; and British Patent No.

1,408,945 to Hakanson et al, which have a plasticity value in excess of 2,000 square mm at 100° C. All of these patents are hereby fully incorporated by reference with regard to the method, process, and all other aspects in making the powdered urethane or powdered urethane-urea polymers. Usually, suspending polyurethane polymers having a plasticity value of up to 12,000 square mm and even 15,000 square mm (at 150° C) may be utilized. A preferred range is generally from about 4,000 to about 5,000 square mm.

According to the present invention, the plasticity of the powder is readily determined in the following manner. A Fred S. Carver electrically heated press is utilized having 6 by 6 inch platens controlled to plus or minus 0.5° C. Additionally, aluminum foil from 0.75 to 4 mils thick is utilized having one side coated with Dow Corning No. 20 Mold Release. The press is set at 150° C and allowed to reach equilibrium. Then, a 0.5 gram sample of the powdered polyurethane is placed in the center of the aluminum foil which is approximately 6 by 6 inches with the mold release coating being inside or contacting the sample. The foil containing the sample is then placed in the press and the platens closed for 10 seconds. A 2,000 pound gauge pressure is then applied for 30 seconds. The sample is then removed and the area determined with a planimeter. The final area of the sample in square millimeters is a plasticity of the particular powder.

Generally, spin molding may be used for either large or small articles. Specific examples include automotive, boat and airplane gas tanks, tires, balls, and the like.

EXAMPLE I

A Waring Blender, thoroughly purged with nitrogen was charged with 1000cc of dry hexane. Then, 0.5cc of SF-1034 silicone surfactant was added along with 0.5cc of DC-190 silicone surfactant. Dibutyltin dilaurate in the amount of 0.5 grams was then added. The urethane prepolymer in the amount of 100 grams in the form of Tranco-Cast T-3085 (polytetrahydrofuran/diphenyl methane diisocyanate) was added. The amount of free isocyanate groups was 9 percent. The Waring Blender was stirred at about 340 RPM for about 10 minutes and 9.23cc of 1,4-butane diol (0.90 equivalence) was added. Discrete particles became visible in about 3 to 5 minutes. After 4 hours of polymerization, the polymer was filtered and contained only 1 to 2 percent of hexane after a filtration period of 15 minutes. This small amount of hexane was removed under a vacuum of 0.5mm of mercury at 50° C. The yield was 91.5 percent with a suspension powder at 89.0 percent.

Properties of this suspension polyurethane made in both a blender and a flask are set forth in Table I.

TABLE I

| EXAMPLE[a] | 2 | 3 |
|---|---|---|
| Reaction Vessel | Blender | Flask |
| % Theoretical Butanediol | 90 | 97.5 |
| DBT DL[b] | 8 drops | 0.5 grams |
| Particle size, mm, average | 0.16 | 0.15 |
| Yield, % | 91.5 | 95 |
| Suspension Polymer, % | 89 | 92.5 |
| MN (GPC) | 47,200 | 49,200 |
| MW | 66,800 | 66,400 |
| MW/MN | 1.42 | 1.35 |
| DSV | 0.38 | 0.49 |
| Plasticity (square mm) | 3,750 | — |
| Molded Films | | |
| Tensile, psi | 5,175 | 3,250 |
| % Elongation | 1,245 | 760 |
| 100% Modulus, psi | — | 835 |
| Solution Cast Film | | |
| Tensile, psi | 3,100 | 4,660 |

TABLE I-continued

| EXAMPLE[a] | 2 | 3 |
|---|---|---|
| % Elongation | 1,440 | 1,413 |
| 100% Modulus, psi | — | 830 |
| Tg ° C (DuPont) | −81 | −79 |
| Roto Castable | Good | Good |

[a]Example 2 and 3, both contained 0.5 phr DC-190 + 0.5 phr SF-1034.
[b]Dibutyltin dilaurate catalyst.

In order to determine the effect of an amine chain extender upon the polyurethane, ethylenediamine and MDA (methylenedianiline) was utilized in a manner as set forth in Examples II and III.

EXAMPLE II

In a manner similar to Example I, 500cc of dry hexane was added to a Waring Blender. Then, 0.25 g of SF-1034 and 0.25 g of Diene 35 (polybutadiene manufactured by Firestone) was added. Additionally, 50 g of Adiprene L-167 (poly THF terminated with TDI, molecular weight, approximately 1,000) was added. Ethylene diamine (2.3 g) was added as a chain extender and the reaction allowed to proceed for 1 hour. Ethyl alcohol was added to terminate the reaction with the product being filtered and dried. An overall yield of 98 percent was obtained with 78 percent suspension powders. The gel content was 54.8 percent. This amount gradually increased to over 90 percent in a two month period and was no longer soluble or processable. The following physical properties of the initial product were obtained:

| Molded at 177° C | |
|---|---|
| Tensile, psi | 4,400 |
| % Elongation | 1,264 |
| Shore A Hardness | 96 |
| Plasticity (square mm) | — |

EXAMPLE III

To a Waring Blender was added the following formulation:

| 500 ml | dry hexane |
|---|---|
| 0.25cc | SF-1034 |
| 0.25cc | DC-190 |
| 50 g | Adiprene L-167 |

Then added to the formulation was 7.7 g of methylene dianiline in 20cc of DMF.

The reaction was allowed to proceed for approximately 4.5 hours with the product being filtered and dried. An overall yield of approximately 99 percent was obtained of which 59 percent was suspension powder. A gel content of 31.95 was obtained. The polymer product had the following physical properties:

| DSV in DMF | 0.62 |
|---|---|
| % Gel | 31.95 |
| Tensile, psi | 3,041 |
| % Elongation | 733 |
| 10% Modulus, psi | 1,020 |
| Plasticity (square mm) | — |

This product was not roto castable.

Thus, it is readily apparent from Examples II and III that the utilization of a diamine curing agent or chain extender does not produce a good product and further-more results in undesirable and extremely high gel content.

Examples IV and V set forth further examples of hydroxyl terminated compounds and the properties of the suspension polyurethanes produced therefrom.

EXAMPLE IV

Polymerization was carried out in a Waring Blender under nitrogen using the following charge:

| | |
|---|---|
| 500 ml | dry hexane |
| 0.5 ml | SF-1,034 |
| 0.25cc | DC-190 |
| 0.125 | SF-96 (silicone oil) |
| 0.25ml | dibutyltin dilaurate |
| 56 g | S3-860(Polycaprolactone-MDI) |
| 3.67 g | 1,4-butanediol |

The reaction was carried out for approximately 4.5 hours with the polymer being filtered and dried. An overall yield of approximately 98 percent was obtained having a DSV value of 0.74. Plaques were then molded at approximately 165° C and gave the following properties:

| Room Temperature | Tensile Strength, psi | 3,421 |
|---|---|---|
| | % Elongation | 1,325 |
| | 10% Modulus, psi | 177 |
| | 100% Modulus, psi | 421 |
| 100° C | Tensile Strength through 100% Modulus | 120 |
| | % Elongation | 145 |
| | 10% Modulus, psi | 45 |
| | 100% Modulus, psi | 120 |
| Plasticity (square mm) | | 2,450 |

EXAMPLE V

To a 2 liter flask equipped with nitrogen inlet and outlet, thermometer and mechanical stirring devices were added the following formulation:
 1000 ml of dry hexane (dried over $CaH_2$)
 0.5 ml of SF-1034
 0.5 ml of DC-190
 0.6 ml of Dibutyltin dilaurate catalyst
 100 g of Tranco S3-097 (Ethylene Propylene Adipate -MDI) (9.06% NCO)
 9.72 g of 1,4-butanediol An exotherm of 4° C was reached approximately 30 minutes after the addition of diol (from 23° C to about 27° C). The vessel was stirred overnight and the product filtered. The polymer was dried at 60° C at 0.2 millimeters of mercury for two hours. An overall yield of 95.6 percent was obtained.

A sample was molded at 170° C for 5 minutes and the following properties were obtained:

| Room Temperature | Tensile, psi | 5,632 |
|---|---|---|
| | % Elongation | 715 |
| | 10% Modulus, psi | 368 |
| | 100% Modulus, psi | 1,193 |
| 100° C | Tensile, psi | 1,055 |
| | % Elongation | 500 |
| | 10% Modulus, psi | 121 |
| | 100% Modulus, psi | 484 |
| Plasticity (square mm) | | 2,250 |

The polymer had a dilute solution viscosity of 0.56.

EXAMPLE VI

To a two liter flask was added the following charge:

| | |
|---|---|
| 1,200 ml | dry hexane |
| 0.75 ml | SF-1034 |
| 0.75 ml | DC-190 |
| 1.75 g | Naugard 445 antioxidant (an amine-type antioxidant made by Uniroyal) |
| 100 g | Polycaprolactone (PCP-0240,Mol.Wt. 2000) |
| 18 g | 1,4-butanediol |

These compounds were agitated about 350 rpm at 30° C for approximately 10 minutes and then 74 grams of Isonate 143L (MDI and tri-functional cycloadducts). The vessel was stirred for approximately 55 minutes and then 0.3 milliliters of dibutyltin dilaurate was added. The reaction was then continued for 80 minutes with the polymer then being filtered and vacuum dried. The size of the particles was approximately 1 to 3 milliliters; rather large for a suspension polymer. The DSV was 0.36 indicating medium molecular weight. Plaques were molded at 172° C and gave the following properties:

| Room Temperature | Tensile, psi | 4,518 |
|---|---|---|
| | % Elongation | 882 |
| | 10% Modulus, psi | 267 |
| | 100% Modulus, psi | 78 |
| 100° C | | |
| | Tensile, psi | 720 |
| | % Elongation | 570 |
| | 10% Modulus, psi | 81 |
| | 100% Modulus, psi | 321 |
| Plasticity (square mm) | | 4,040 |

Examples VII and VIII were prepared utilizing a large excess (20 percent) of butane diol. The polyurethane product generally had a lower molecular weight, a lower melt viscosity and flowed more readily making them very suitable for roto casting and the like. Toluene diisocyanate dimer was utilized as a curing agent.

EXAMPLE VII

To a two liter flask was added the following components:

| | |
|---|---|
| 1,200 ml | dry hexane |
| 0.75 ml | SF-1034 |
| 0.75 ml | DC-190 |
| 0.375 ml | SF-96 (Dimethyl polysiloxane silicone oil) |
| 0.75 ml | Dibutyltin dilaurate |
| 150 g | T-3085 (Poly THF - MDI) (6.65% NCO) |
| 12,84 g | 1,4-butanediol (120% of theoretical) |

The polymerization was carried out for 5 hours at 25° to 30° C, the polymer filtered and vacuum dried. The bulk of the particle had an average particle size of 0.2 mm. The polymer had a DSV of 0.34 and 0.0 percent gel. Films of about 0.020 inches were pressed or cured and evaluated as shown below:

| | A | B |
|---|---|---|
| Curing Agent | none | TDI dimer[a] |
| Cure min. | 5 | 5 |
| ° C | 155 | 155 |
| Post Cure, Min. | — | 5 |
| ° C | — | 165 |
| DSV | 0.34 | — |
| Room Temperature Test | | |
| Tensile, psi | 1,480 | 5,640 |
| % Elongation | 1,200 | 1,060 |
| 10% Modulus, psi | 200 | 211 |
| 100% Modulus, psi | 514 | 645 |
| 100° C Test | | |
| Tensile, psi | 127 | 629 |
| % Elongation | 45 | 580+ |
| 10% Modulus, psi | 54 | 104 |
| 100% Modulus, psi | — | 295 |

-continued

|  | A | B |
|---|---|---|
| Plasticity (square mm) | 8,400 | — |

[a] The cure obviously strengthens the product at room temperature and at elevated temperatures.

EXAMPLE VIII

To a two liter flask was added the following charge:

| 1,200 ml | dry hexane |
| 0.75 ml | SF-1034 |
| 0.75 ml | DC-190 |
| 0.75 ml | Dibutyltin dilaurate |
| 150 g | T-3085(Poly THF-MDI) at 9% free NCO |
| 17.39 g | 1,4-butanediol (120% theoretical) |

The reaction was carried out for four and a half hours at 25° to 29° C, filtered and vacuum dried. A yield of 99 percent was obtained. Films were pressed or cured as shown below and the following properties obtained.

|  | A | B |
|---|---|---|
| Curing Agent | none | TDI dimer[a] |
| Curing Min. | 5 | 5 |
| °C | 155 | 155 |
| Post Cure Min. | — | 5 |
| °C | — | 165 |
| DSV | 0.21 | 0.29 |
| Room Temperature Test |  |  |
| Tensile, psi | 674 | 3,384 |
| % Elongation | 46 | 1,030 |
| 10% Modulus, psi | 490 | 349 |
| 100% Modulus, psi | — | 884 |
| 100° C Test |  |  |
| Tensile, psi | 55 | 298 |
| % Elongation | 5 | 60 |
| 10% Modulus, psi | — | 122 |
| Plasticity (square mm) | 4,040 | — |

[a] Stoichiometric equivalent of hydroxy groups on polymer. This high flow polymer (relatively low molecular weight) was weak before curing but quite good after curing.

The B stock products a good roto cast specimen at 200° C with smooth exterior surface and good tear strength.

EXAMPLE IX

Six batches of polymer powder were prepared using the following recipe:

| 3000 ml | dry hexane |
| 1.3 ml | DC-190 |
| 1.3 ml | SF-1034 |
| 1.3 ml | Super Wetter FP (a silicone surfactant made by Union Carbide) |
| 1.0 ml | Tributylamine |
| 0.075 g | Dibutyltin dilaurate |
| 404 g | S3-097 Polyester prepolymer[b] |
| 38.76 g | 1,4-butanediol |

[b] Ethylene propylene adipate - MDI terminated; 9 percent NCO (1000 M.W.)

The materials were added in the listed order at room temperature. There was a 3.5° C exotherm which peaked at about 40 minutes after butanediol addition. The reaction and stirring was continued for 22.5 hours and 6 ml n-butylamine added to essentially stop the reaction. The powders were filtered and vacuum dried. Product recovery was essentially quantitative. There was only 0.5 percent of the product remaining as film on the flask and stirrer. Only 0.7 percent of the product would not pass through a No. 20 U.S. Standard Sieve. These slightly larger lumps had the same viscosity as the powder and were usable.

The blended powders were molded in a semi-positive pressure mold for 5 to 20 minutes at 155° C and evaluation produced the following physical properties:

|  | NO CURATIVE | TDI DIMER[a] |
|---|---|---|
| Ring Tensile, psi | 2150 | 4842 |
| % Elongation | 277 | 337 |
| Modulus, 50% | 1058 | 1310 |
| 100% | 1255 | 1735 |
| 300% | — | 4080 |
| Plasticity (square mm) | 3380 | — |

[a] Contained 5 phr TDI Dimer.

Portions (100g) of the powder were also roto cast in the McNeil Model No. 500-48 unit at an air temperature of 490° F for 4.5 minutes using quart tin cans as molds. Strips were cut from these samples and the following evaluation was obtained:

|  |  | NO CURATIVE | TDI DIMER |
|---|---|---|---|
| Tensile, psi |  | 751 | 3370 |
| % Elongation |  | 78 | 718 |
| Modulus, 50% |  | 736 | 761 |
| (psi) | 100% | — | 887 |
|  | 300% | — | 1290 |

As apparent from the data, very good physical properties were obtained.

EXAMPLE X

The recipe was identical to the Example IX blend but contained no amine stopping agent and used 0.25 g dibutyltin dilaurate as a catalyst. The polymer had a slightly higher molecular weight than the Example IX product. The following physical properties were determined.

| COMPRESSION MOLDED |  | NO CURATIVE | CURED[a] |
|---|---|---|---|
| Room Temperature Test |  |  |  |
| Strip Tensile, psi |  | 2,233 | 5,782 |
| % Elongation |  | 718 | 800 |
| Modulus, 10% |  | 384 | 438 |
| (psi) | 100% | 966 | 1,144 |
| 100° C Test |  |  |  |
| Strip Tensile, psi |  | 236 | 596 |
| % Elongation |  | 48 | 589 |
| Modulus, 100% |  | 103 | 91 |
| (psi) |  |  |  |
| Plasticity (square mm) |  | 2,240 | — |

[a] Contained 5 phr TDI Dimer plus 3 phr Naugard 445.

The cured stocks have excellent strength and retain good elongation when evaluated at 100° C.

The suspension polymer also produced good roto cast specimens which were made in a manner similar to Example IX and gave the following physical properties:

|  | NO CURATIVE | TDI DIMER CURE |
|---|---|---|
| Tensile, psi | 1337 | 3586 |
| % Elongation | 690 | 655 |
| Modulus, psi, 50% | 779 | 1085 |
| 100% | 882 | 1266 |
| 300% | 1004 | 1781 |

The roto casted and cured polymers had good stress-strain properties. These specimens also had relatively uniform thickness and had good shiny surfaces.

EXAMPLE XI

Prepolymers of higher molecular weight (above 1,000) yield polymers which are softer but have better low temperature properties and sometimes other advantages. Accordingly, a urethane copolymer was made which had the following recipe:

RECIPE

| | |
|---|---|
| Hexane | 1,000 ml |
| SF-1034 | 0.75 ml |
| DC-190 | 0.75 ml |
| Dibutyltin Dilaurate | 0.75 ml |
| S3-717 | 100 grams[a] |
| 1,4-butanediol | 7.0 ml |

The vessel was stirred at 250 RPM for 18 hours at about 27° C to 29° C, filtered and vacuum dried.

When tested, the following properties were obtained:

| | |
|---|---|
| Tensile, psi | 3,482 |
| % Elongation | 1,358 |
| 10% Modulus, psi | 246 |
| 100% Modulus, psi | 622 |
| Plasticity (sq. mm) | 4,550 |

When cured via a roto cast operation using a TDI Dimer as in Example IX, a superior product or article was produced. The articles were strong, smooth and no gassing problems occurred which sometimes occurs in polymers from lower molecular weight prepolymers.

EXAMPLE XII

"ONE-SHOT" PROCESS

The following materials were added to a 2 liter flask with 275 rpm stirring at 40° C.

| | |
|---|---|
| Hexane | 1,300 ml |
| SF-1034 | 2 |
| DC-190 | 1 |
| Super Wetter FP | 1 |
| DBT DL | 0.4 |
| Poly Meg 1000 | 200 g (Poly THF, Mol. Wt. of 1,000) |
| 1,4-butane diol | 9.0 ml |
| n-butanol | 1.8 ml |
| MDI | 75 g. |

The reaction produced an exotherm of 17.8° C in 4 minutes. The reaction was continued for 6 hours and 4.5 ml of n-butyl amine was added as a stopping agent. The polymer was filtered and dried. The product had an inherent viscosity of 0.41, a 150° C plasticity of 7,100 sq. mm, and a Tg of −58° C. The following properties were obtained on molded or cured slabs.

| | UNCURED | CURED |
|---|---|---|
| Tensile, psi | 219 | 2,390 |
| % Elongation | 170 | 1,975 |
| Modulus, psi, 10 % | 72 | 103 |
| 100% | 209 | 244 |
| 300% | — | 307 |

As apparent from the data, the properties of the polyurethane made according to the "one-shot" process are fairly good.

EXAMPLE XIII

"ONE-SHOT" SUSPENSION POWDER

The following materials were added, under nitrogen, to a 5 liter, 3 neck flask with stirring at 415 rpm.

| | |
|---|---|
| Hexane | 3,000 ml. |
| SF-1034 | 6 ml. |
| DC-190 | 6 ml. |
| Super Wetter FP | 2 ml. |
| Dibutyltin dilaurate | 0.2 ml. |
| 830 MW polycaprolactone (0.482 moles) polyol | 400 g. at 60° C) |
| 1,4-butanediol (0.9349 moles) | 82.6 ml. |
| n-butanol (.0289 moles) | 2.7 ml. |
| Diphenylmethane diisocyanate (1.446 moles) | 361.5 g. at 55° C. |

Half the MDI was added at 31° C when other materials were suspended. It gave an exotherm of 19° C in 10 minutes. The other half of MDI was added and gave an exotherm of 9.6° C. The reaction was continued for 2 hours, then 20 cc of ethanol was added to stop the polymerization. The powder was filtered and dried, giving an overall yield of 99.7 percent, of this 99.6 percent passed through a No. 20 U.S. Sieve. The inherent viscosity in DMF was 0.29 and 150° plasticity 4710 sq. mm.

The powder (XIII) was molded for 7 minutes at 165° C. Additionally, the same powder containing 5 phr TDI dimer, cured 25 minutes at 167° C (XIII A). The physical properties obtained are as follows:

| Ring Tensile at Room Temperature | | |
|---|---|---|
| SAMPLE | XIII | XIII A |
| Tensile, psi | 1,653 | 5,981 |
| % Elongation | 30 | 263 |
| Tensile Modulus psi - 10 % | 628 | 923 |
| 50 % | — | 2,275 |
| 100% | — | 3,063 |
| Tensile, psi Ring Tensile at 100° C | 230 | 1,134 |
| % Elongation | 10 | 193 |
| Modulus, 100% | — | 690 |
| 200% | — | 1,158 |
| Roto Castings 210° C | Smooth | Smooth |

Hence, it can be seen that Example XIII A, when cured, readily gave vastly improved properties.

While in accordance with the patent statutes, preferred embodiments have been illustrated and described in detail, it is to be understood that the invention is not limited thereto, the scope of the invention being measured solely by the scope of the attached claims.

What is claimed is:

1. A suspension polymerization process for producing polymerized suspended polyurethanes, comprising the steps of:
   adding a silicone surfactant to a nonaqueous suspending medium,
   said suspending medium being a nonsolvent with respect to polymerized urethanes,
   adding urethane prepolymers to the resulting nonaqueous suspending medium,
   agitating said nonaqueous suspending medium containing said silicone surfactant and said urethane prepolymers, and
   polymerizing said urethane prepolymers by adding a chain extending agent to said suspending medium containing said urethane prepolymers to produce fine discrete particles of urethane polymers.

2. A suspension process according to claim 1, wherein said urethane prepolymers contain free isocyanate groups, the amount of free isocyanate groups ranges from about 1.75 percent to about 15 percent by weight based upon said urethane prepolymers, and wherein the amount of silicone surfactant ranges from about 0.1 to about 7.0 parts per 100 parts of said prepolymer, said silicone surfactant being a copolymer made from polyoxyalkylene wherein said alkylene group contains from 2 to about 20 carbon atoms and from a substituted polysiloxane wherein said substitution is primarily two methyl groups.

3. A suspension process according to claim 2, wherein said suspending medium is selected from the class consisting of alkanes having from 4 to 12 carbon atoms and cyclohexane, and said chain extending agent being selected from the class consisting of diols and amino alcohols having from 2 to about 7 carbon atoms, the equivalent amount of said diol and to said free isocyanate groups ranging from about 0.8 to about 1.5.

4. A suspension polymerization process according to claim 3, wherein the amount of free isocyanate groups ranges from about 2.7 to about 12.0 percent, the amount of said silicone surfactant ranges from about 0.5 to about 2 parts per 100 parts of said prepolymer, the equivalent amount of said chain extending agent ranges from about 0.9 to about 1.3 based upon said free isocyanate groups, the molecular weight of said urethane prepolymer ranges from 600 to about 5,000 and the polymerization temperature ranges from about 0° C to about 100° C.

5. A suspension process according to claim 4, wherein the amount of free isocyanate groups and said urethane prepolymer ranges from about 6 percent to about 9 percent by weight, wherein a chain extending agent is butane diol and the equivalent amount of said butane diol to said free isocyanate groups ranges from about 0.95 to about 1.0.

6. A suspension process according to claim 2, including the additional step of adding a curing agent to said urethane polymer and spin molding and heating said blend to produce a cured article.

7. A suspension process according to claim 6, wherein said curing agent is selected from the class consisting of diisocyanates having the formula $R(N=C=O)_2$ where R is an aliphatic containing from 2 to about 20 carbon atoms, a cycloaliphatic containing from 4 to about 20 carbon atoms, an aromatic containing from 6 to about 20 carbon atoms, and mixtures thereof; a dimer of toluene diisocyanate, a dimer of diphenylmethane diisocyanate, organic peroxides and epoxides; said curing temperature ranges from about 130° C to a temperature below the decomposition temperature of said curing agent; and, the amount of said curing agent is from about 0.2 to about 10.0 parts by weight per 100 parts of said urethane polymer.

8. A suspension process according to claim 7, wherein said curing agent is selected from the group consisting of diphenylmethane diisocyanate, bitoluene diisocyanate, dianisidine diisocyanate, hexamethylene diisocyanate, 1,5-naphthylene diisocyanate, the dimer of diphenylmethane diisocyanate, the dimer of toluene diisocyanate, and dicumyl peroxide, and said curing temperature ranges from about 130° C to about 250° C.

9. A suspension process according to claim 4, including the additional step of adding a curing agent to said urethane polymer, mixing said curing agent and polymer to form a blend and spin molding and heating said blend to produce a cured article, said curing agent selected from the class consisting of diisocyanates having the formula $R(N=C=O)_2$ where R is an aliphatic containing from 2 to about 20 carbon atoms, a cycloaliphatic containing from 4 to about 20 carbon atoms, an aromatic containing from 6 to about 20 carbon atoms, and mixtures thereof; a dimer of toluene diisocyanate, a dimer of diphenylmethane diisocyanate, organic peroxides and epoxides, and said heating temperature ranging from about 130° C to below the decomposition temperature of said curing agent.

10. A suspension process according to claim 9, wherein said curing agent is selected from the class consisting of diphenylmethane diisocyanate, bitoluene diisocyanate, dianisidine diisocyanate, hexamethylene diisocyanate, 1,5-naphthylene diisocyanate, the dimer of diphenylmethane diisocyanate, the dimer of toluene diisocyanate the dicumyl peroxide, and said heating temperature ranges from about 130° C to about 250° C.

11. A suspension process for producing polymerized polyurethanes, comprising the steps of:
adding a silicone surfactant to a nonaqueous suspending medium,
said suspending medium being a nonsolvent with respect to the polymerized urethanes,
adding a polyhydroxyl terminated compound and a diisocyanate compound to said vessel to produce a urethane prepolymer,
agitating said nonaqueous suspending medium containing said silicone surfactant, said polyhydroxyl terminated compound and said diisocyanate compound,
polymerizing said polyhydroxyl terminated compound and said diisocyanate at a temperature of from about 0° C to about 100° C to produce urethane prepolymers,
said urethane prepolymers having from 1.75 to about 15 percent by weight of free isocyanate groups based upon said urethane prepolymers, and
adding a chain extending agent to said agitated suspending medium containing said urethane prepolymers to produce fine discrete particles of urethane polymers.

12. A suspension process according to claim 11, wherein the amount of said silicone surfactant ranges from about 0.1 to about 7.0 parts per 100 parts of said prepolymer, said silicone surfactant being a copolymer made from polyoxyalkylene wherein said alkylene group contains from about 2 to about 20 carbon atoms and from a substituted polysiloxane wherein said substitution is primarily two methyl groups, said hydroxyl terminated compounds selected from the class consisting of polyesters, polyethers, polyols, polyester polyols, mixed polyester polyamides, and polycaprolactones, said diisocyanates have the formula $R(N=C=O)_2$ wherein R is an aliphatic containing from 2 to about 20 carbon atoms, a cycloaliphatic containing from 4 to about 20 carbon atoms, an aromatic containing from 6 to about 20 carbon atoms, and mixtures thereof, and wherein said chain extending agent is selected from the class consisting of diols and amino alcohols having from 2 to about 7 carbon atoms, the equivalent amount of said diol to said free isocyanate groups ranging from about 0.8 to about 1.5.

13. A suspension process according to claim 12, wherein said suspending medium is selected from the class consisting of alkanes having from 4 to 12 carbon atoms and cyclohexane, the amount of free isocyanate groups ranges from about 2.7 to about 12.0 percent by weight based upon the urethane prepolymer, the amount of said silicone suspending agent ranges from about 0.5 to about 2.0 per 100 parts of said prepolymer, the equivalent amount of said diol to said free isocyanate groups ranges from about 0.9 to about 1.3, the reaction temperature of said urethane prepolymer formation ranges from about 0° C to about 100° C, and the polymerizing temperature of said urethane polymer ranges from about 0° C to about 100° C.

14. A suspension process according to claim 13, wherein said polyhydroxyl terminated compounds are selected from the group consisting of polypropylene ether diol, polytetramethylene ether glycol, polyethylenepropylene adipate and polycaprolactone.

15. A suspension process according to claim 13, wherein said diol is butane diol and the equivalent amount of said butane diol ranges from about 0.95 to about 1.05 based upon said free isocyanate groups, the amount of said free isocyanate groups ranges from about 6.0 to about 9.0 percent by weight based upon the urethane prepolymer and the molecular weight of said urethane prepolymer ranges from about 600 to about 5,000.

16. A suspension process according to claim 12, including the additional step of adding a curing agent, the amount of curing agent being from 0.2 to about 10 parts by weight per 100 parts of polymer, and spin molding and heating to produce a cured article.

17. A suspension process according to claim 16, wherein said curing agent is selected from the class consisting of diisocyanates having the formula $R(N\!=\!C\!=\!O)_2$ where R is an aliphatic containing from 2 to about 20 carbon atoms, a cycloaliphatic containing from 4 to about 20 carbon atoms, an aromatic containing from 6 to about 20 carbon atoms, and mixtures thereof; a dimer of toluene diisocyanate, a dimer of diphenylmethane diisocyanate, organic peroxides and epoxides, and said curing temperature ranging from 130° C to below the decomposition temperature of said curing agent.

18. A suspension process according to claim 17, wherein said curing agent is selected from the class consisting of diphenylmethane diisocyanate, bitoluene diisocyanate, dianisidine diisocyanate, hexamethylene diisocyanate, 1,5-naphthylene diisocyanate, the dimer of diphenylmethane diisocyanate, the dimer of toluene diisocyanate, and dicumyl peroxide, and said curing temperature ranges from about 130° C to about 250° C.

19. A suspension process according to claim 13, including the additional step of adding a curing agent to said urethane polymer and mixing to produce a blend, the amount of said curing agent ranging from about 0.2 to about 10 parts per 100 parts of said polymer, blending said curing agent and said polymer, and spin molding and heating said blend to produce a cured article, said curing agent selected from the class consisting of diisocyanates having the formula $R(N\!=\!C\!=\!O)_2$ where R is an aliphatic containing from 2 to about 20 carbon atoms, a cycloaliphatic containing from 4 to about 20 carbon atoms, an aromatic containing from 6 to about 20 carbon atoms, and mixtures thereof; a dimer of toluene diisocyanate, a dimer of diphenylmethane diisocyanate, organic peroxides and epoxides, and said curing temperatures ranging from about 130° C to a temperature below the decomposition temperature of said curing agent.

20. A suspension process according to claim 19, wherein said curing agent is selected from the class consisting of diphenylmethane diisocyanate, bitoluene diisocyanate, dianisidine diisocyanate, hexamethylene diisocyanate, 1,5-naphthylene diisocyanate, the dimer of diphenylmethane diisocyanate, the dimer of toluene diisocyanate, and dicumyl peroxide, and said curing temperature ranges from about 130° C to about 250° C.

21. A suspension process for producing polymerized polyurethanes, comprising the steps of:
   adding a silicone surfactant to a nonaqueous suspending medium,
   said suspending medium being a nonsolvent with respect to the polymerized urethanes,
   agitating said nonaqueous suspending medium,
   adding polyhydroxyl terminated compounds to said nonaqueous suspending medium,
   adding compounds selected from the class consisting of diols having from 2 to 7 carbon atoms and amino alcohols having from 2 to 7 carbon atoms, the amount of said compound ranging from 0 to about 5 moles per mole of hydroxyl terminated compound, and
   adding a diisocyanate compound and polymerizing to produce fine discrete particles of urethane polymers.

22. A suspension process according to claim 21, wherein the amount of silicone surfactant ranges from about 0.5 to about 7.0 parts per 100 parts of said hydroxyl terminated compound and said silicone surfactant is a copolymer made from polyoxyalkylene wherein said alkylene group contains from 2 to about 20 carbon atoms and from a substituted polysiloxane wherein said substitution is primarily two methyl groups,
   said hydroxyl terminated compounds are selected from the class consisting of polyesters, polyethers, polyols, polyester polyols, mixed polyester polyamides and polycaprolactones,
   said diisocyanates having the formula $R(N\!=\!C\!=\!O)_2$ where R is an aliphatic containing from 2 to about 20 carbon atoms, a cycloaliphatic containing from 4 to about 20 carbon atoms, an aromatic containing from 6 to about 20 carbon atoms, and mixtures thereof;
   the equivalent amount of said diisocyanate compound to said hydroxyl groups in said polyhydroxyl terminated compound and said compound selected from the group consisting of diols and amino alcohols ranging from about 0.90 to about 1.10 and the amount of diol or amino alcohols ranging from about 0 to about 5 moles per mole of polyhydroxyl terminated compound.

23. A suspension process according to claim 22, wherein the molecular weight of said polyhydroxyl terminated compound ranges from about 600 to about 3,000,
   said suspending medium is selected from the class consisting of alkenes having from 4 to 12 carbon atoms and cyclohexane,
   the equivalent amount of said isocyanate groups to said hydroxyl groups ranges from about 0.99 to about 1.01,
   the amount of diol or amino alcohol ranging from about 0.1 to about 2.0 per mole of polyhydroxyl terminated compound,
   the amount of said silicone suspending agent ranging from about 0.5 to about 7.0 per 100 parts of said polyhydroxyl terminated compound, and the polymerizing temperature of said urethane prepolymer ranges from about 0° C to about 100° C.

24. A suspension process according to claim 23, wherein said polyhydroxyl terminated compounds are selected from the class consisting of polyethylene ether diol, polytrimethylene ether diol, polyhexamethylene ether diol, polypropylene ether diol, polytetramethylene ether glycol, polyethylene adipate, polyethylenepropylene adipate, polypropylene adipate, polybutadiene diol, polycaprolactone, a copolymer of tetrahydrofuran and ethylene oxide and a copolymer of propylene oxide or butane oxide.

25. A suspension process according to claim 24, wherein said diol is butane diol and wherein the molecular weight of said polyhydroxyl terminated compound is from 600 to about 2,000.

26. A suspension process according to claim 22, including the additional step of adding a curing agent to said polymer, the amount of said curing agent ranging from 0.2 to 10 parts per 100 parts of said polymer, and spin molding and heating to produce a cured article.

27. A suspension process according to claim 26, wherein said curing agent is selected from the class consisting of diisocyanates having the formula $R(N{=}C{=}O)_2$ where R is an aliphatic containing from 2 to about 20 carbon atoms, a cycloaliphatic containing from 4 to about 20 carbon atoms, an aromatic containing from 6 to about 20 carbon atoms, and mixtures thereof, a dimer of toluene diisocyanate, a dimer of diphenylmethane diisocyanate, organic peroxides of epoxides, and said curing temperature ranges from about 130° C to below the decomposition temperature of said curing agent.

28. A suspension process according to claim 27, wherein said curing agent is selected from the class consisting of diphenylmethane diisocyanate, bitoluene diisocyanate, dianisidine diisocyanate, hexamethylene diisocyanate, 1,5-naphthylene diisocyanate, the dimer of diphenylmethane diisocyanate, the dimer of toluene diisocyanate, and dicumyl peroxide, and wherein said curing temperature ranges from about 130° C to about 250° C.

29. A suspension process according to claim 24, including the additional step of adding a curing agent to said polymer, the amount of said curing agent ranging from 0.2 to about 10 parts per 100 parts of said polymer, mixing said curing agent and said polymer to produce a blend, and spin molding and heating said blend to produce a cured article, said curing agent selected from the class consisting of diisocyanates having the formula $R(N{=}C{=}O)_2$ where R is an aliphatic containing from 2 to about 20 carbon atoms, a cycloaliphatic containing from 4 to about 20 carbon atoms, an aromatic containing from 6 to about 20 carbon atoms, and mixtures thereof, a dimer of toluene diisocyanate, a dimer of diphenylmethane diisocyanate, organic peroxides and epoxides, said curing temperature ranging from about 130° C to below the decomposition temperature of said curing agent.

30. A suspension process according to claim 29, wherein said curing agent is selected from the class consisting of diphenylmethane diisocyanate, bitoluene diisocyanate, dianisidine diisocyanate, hexamethylene diisocyanate, 1,5-naphthylene diisocyanate, the dimer of diphenylmethane diisocyanate, the dimer of toluene diisocyanate and dicumyl peroxide, and said curing temperature ranges from about 130° C to about 250° C.

31. A process for curing suspension polyurethane powders during spin molding, comprising the steps of:

spinning and heating a mold having therein a fusible suspension powdered compound selected from the class consisting of a polyurethane, a urethane-urea polymer, and combinations thereof, having a plasticity of at least 2,000 square millimeters at 150° C, and a curing agent, said heating temperature ranging from about 130° C to a temperature below the decomposition temperature of said suspension powder to produce a cured article.

32. A process for curing according to claim 31, wherein said curing agents are selected from the class consisting of diisocyanates having the formula $R(N{=}C{=}0)_2$ where R is an aliphatic containing from 2 to about 20 carbon atoms, a cycloaliphatic containing from 4 to about 20 carbon atoms, an aromatic containing from 6 to about 20 carbon atoms, and mixtures thereof, a dimer of toluene diisocyanate, a dimer of diphenylmethane diisocyanate, organic peroxides and epoxides.

33. A process for curing according to claim 32, wherein said mold is heated to a temperature of from about 130° C to about 250° C.

34. A process for curing according to claim 31, wherein said curing agents are selected from the class consisting of diphenylmethane diisocyanate, bitoluene diisocyanate, dianisidine diisocyanate, hexamethylene diisocyanate, 1,5-naphthylene diisocyanate, the dimer of diphenylmethane diisocyanate, the dimer of toluene diisocyanate, and dicumyl peroxide.

35. A process for curing according to claim 34, wherein said mold is heated to a temperature of from about 130° C to about 250° C.

36. A process for curing according to claim 32, including the additional step of blending said suspension powder compound with said curing agent to produce a powdered blend, and adding said powdered blend to said spin mold.

37. A process for curing according to claim 36, wherein said heating temperature ranges from about 130° C to about 250° C.

38. A process for curing according to claim 34, including the additional step of blending said suspension powder compound with said curing agent to produce a powdered blend, and adding said powdered blend to said spin mold.

39. A process for curing according to claim 38, wherein said heated mold is heated to a temperature of from about 130° C to about 250° C.

* * * * *

UNITED STATES PATENT OFFICE
CERTIFICATE OF CORRECTION

Patent No. 4,107,256      Dated August 15, 1978

Inventor(s) Wendell R. Conard, Shingo Futamura & Robert A. Hayes

It is certified that error appears in the above-identified patent and that said Letters Patent are hereby corrected as shown below:

Column 17, line 16; Add ... $^{a)}$Ethylene propylene adipate (after "RECIPE")

(2,000 molecular weight)/MDI (6.65 percent NCO) manufactured by Tranco. ...

Signed and Sealed this

Nineteenth Day of June 1979

[SEAL]

Attest:

RUTH C. MASON
*Attesting Officer*

DONALD W. BANNER
*Commissioner of Patents and Trademarks*